(12) United States Patent
Sung et al.

(10) Patent No.: US 9,090,721 B2
(45) Date of Patent: Jul. 28, 2015

(54) HIGHLY HEAT RESISTANT AND HIGHLY STRONG ACRYLIC COPOLYMER, A RESIN COMPOSITION COMPRISING THE SAME AND AN OPTICAL FILM AND AN IPS MODE LIQUID CRYSTAL DISPLAY DEVICE COMPRISING THE SAME

(75) Inventors: Da-Eun Sung, Daejeon (KR); Su-Kyung Kim, Daejeon (KR); Byung-Il Kang, Daejeon (KR); Chang-Hun Han, Daejeon (KR); Dae-Woo Lee, Busan (KR); Jae-Bum Seo, Daejeon (KR); Eun-Jung Choi, Daejeon (KR); Yu-Taek Sung, Daejeon (KR)

(73) Assignee: LG CHEM, LTD., Seoul (KR)

( * ) Notice: Subject to any disclaimer, the term of this patent is extended or adjusted under 35 U.S.C. 154(b) by 298 days.

(21) Appl. No.: 13/818,015

(22) PCT Filed: Aug. 19, 2011

(86) PCT No.: PCT/KR2011/006141
§ 371 (c)(1),
(2), (4) Date: Feb. 20, 2013

(87) PCT Pub. No.: WO2012/023834
PCT Pub. Date: Feb. 23, 2012

(65) Prior Publication Data
US 2013/0150546 A1    Jun. 13, 2013

(30) Foreign Application Priority Data

Aug. 20, 2010 (KR) .......... 10-2010-0081046
Aug. 19, 2011 (KR) .......... 10-2011-0082845

(51) Int. Cl.
*C08F 120/10* (2006.01)
*C08F 120/56* (2006.01)

(52) U.S. Cl.
CPC ............. *C08F 120/10* (2013.01); *C08F 120/56* (2013.01)

(58) Field of Classification Search
CPC .... C08F 220/14; C08F 220/56; C08F 265/06; C08F 293/005; C08F 120/10; C08F 120/56
USPC .................................. 526/303.1, 312, 329.2
See application file for complete search history.

(56) References Cited

U.S. PATENT DOCUMENTS

| 5,840,799 A * | 11/1998 | Mayer et al. .......... 524/507 |
| 2002/0004572 A1 | 1/2002 | Morisada et al. |
| 2009/0135483 A1 * | 5/2009 | Asano et al. .......... 359/500 |
| 2011/0269910 A1 | 11/2011 | Chun et al. |
| 2011/0297896 A1 * | 12/2011 | Kim et al. .......... 252/585 |

FOREIGN PATENT DOCUMENTS

| JP | S60-81239 A | 5/1985 |
| JP | 02-153968 A | 6/1990 |
| JP | 06-211907 A | 8/1994 |
| JP | 07-507594 A | 8/1995 |
| JP | 2001-342263 A | 12/2001 |
| JP | 2008-146003 | 6/2008 |
| JP | 2008-299096 | 11/2008 |
| JP | 2008-291191 A | 12/2008 |
| JP | 2009-275170 A | 11/2009 |
| KR | 10-2010-0081932 | 7/2010 |

OTHER PUBLICATIONS

Yamago, et al, Tailored Synthesis of Structurally Defined Polymers by Organotellurium-Mediated Living Radical Polymerization (TERP): Synthesis of Poly(meth)acrylate Derivatives and Their Di- and Triblock Copolymers, J. Am. Chem. Soc., 2002, p. 13666-13667, vol. 124.

* cited by examiner

*Primary Examiner* — Ling Choi
*Assistant Examiner* — Chun-Cheng Wang
(74) *Attorney, Agent, or Firm* — McKenna Long & Aldridge, LLP

(57) ABSTRACT

Provided is an acrylic copolymer comprising; an alkyl (meth)acrylate monomer; a monomer comprising a cyclic pendant structure; and a tert-butyl (meth)acrylate monomer and/or (meth)acrylamide monomer. Also provided is a resin composition comprising the same and an optical film and an IPS mode liquid crystal display device using the same.

11 Claims, No Drawings

HIGHLY HEAT RESISTANT AND HIGHLY STRONG ACRYLIC COPOLYMER, A RESIN COMPOSITION COMPRISING THE SAME AND AN OPTICAL FILM AND AN IPS MODE LIQUID CRYSTAL DISPLAY DEVICE COMPRISING THE SAME

This application is a National Stage Entry of International Application No. PCT/KR 2011/006141, filed Aug. 19, 2011, and claims the benefit of Korean Application Nos. 10-2010-0081046 filed on Aug. 20, 2010 and 10-2011-0082845 filed Aug. 19, 2011, all of which are hereby incorporated by reference in their entirety for all purposes as if fully set forth herein.

TECHNICAL FIELD

The present invention relates to an acryl-based copolymer, a resin composition comprising the same, and an optical film using the resin composition, and more particularly, to an acryl-based copolymer having optical properties suitable for an IPS mode liquid crystal display and having excellent heat resistance, a resin composition comprising the acrylic copolymer, and an optical film manufactured using the resin composition.

BACKGROUND ART

In the field of displays, a liquid crystal display (LCD) has been widely used as an alternative to existing cathode ray tube-based displays. LCDs exhibit a tendency toward slimness, are lightweight, and a allow for a large display size, and with these tendencies, research into enhancing uniformity of displayed images, and contrast ratios or viewing angles of LCD display devices to realize higher picture quality have been continuously performed.

In general, an LCD comprises a color filter array substrate formed with a black matrix for preventing light leakage, and a color filter layer for realizing colorization, a thin film transistor (TFT) array substrate formed with thin film transistors and an electrode, and a liquid crystal cell interposed between the color filter array substrate and the TFT array substrate. These LCDs are classified into a twisted nematic LCD, a super twisted nematic LCD, a vertical alignment LCD, an in-plane switching mode LCD, etc. according to arrangements of liquid crystal molecules within the liquid crystal cell.

In such LCDs, since optical anisotropy of liquid crystal molecules in a liquid crystal cell allows a refractive index to vary with a viewing angle, thus changing picture color and brightness, a compensation film for compensating for such a change is used. At this time, since the optical anisotropy of the liquid crystal cell varies with the alignment of liquid crystal molecules, optical properties of the compensation film also vary with the mode of a liquid crystal cell.

To solve a viewing angle issue due to birefringence characteristics of liquid crystal molecules, a uniaxially or biaxially stretched TriAcetyl Cellulose (TAC) film or Cyclo-Olefin Polymer (COP) film has mainly been used as a related art compensation film. However, since optical characteristics (especially retardation characteristics) are determined according to basic birefringence of a raw material and a polymer chain orientation, there is a limitation on manufacturing a compensation film having desired optical characteristics from only existing films.

Therefore, there is a need to develop a new raw material to manufacture a compensation film having a more excellent characteristic.

DISCLOSURE

Technical Problem

An aspect of the present invention is to provide an acrylic copolymer having excellent optical properties, especially, optical properties suitable for an IPS mode liquid crystal display and having excellent heat resistance, a resin composition comprising the acrylic copolymer, and an optical film manufactured using the resin composition.

Technical Solution

According to an aspect of the present invention, there is provided an acrylic copolymer comprising an alkyl (meth) acrylate-based monomer; a monomer comprising a cyclic pendant structure; and a tert-butyl (meth)acrylate-based monomer. The acryl-based copolymer may further comprise (meth)acrylamide-based monomer according to a need.

The alkyl group of the alkyl (meth)acrylate-based monomer may have a carbon number of 1-10, preferably 1-4, and more preferably 1-2, and most preferably a methyl (meth) acrylate.

The monomer comprising the cyclic pendant structure may be styrene based unit, for example, α-methylstyrene, 3-methylstyrene, 4-methylstyrene, 2,4-dimethylstyrene, 2,5-dimethylstyrene, 2-methyl-4-chlorostyrene, 2,4,6-trimethylstyrene, cis-β-methylstyrene, trans-β-methylstyrene, 4-methyl-α-methylstyrene, 4-fluoro-α-methylstyrene, 4-chloro-α-methylstyrene, 4-bromo-α-methylstyrene, 4-t-butyl styrene, 2-fluorostyrene, 3-fluorostyrene, 4-fluorostyrene, 2,4-difluorostyrene, 2,3,4,5,6-pentafluorostyrene, 2-chlorostyrene, 3-chlorostyrene, 4-chlorostyrene, 2,4-dichlorostyrene, 2,6-dichlorostyrene, octachlorostyrene, 2-bromostyrene, 3-bromostyrene, 4-bromostyrene, 2,4-dibromostyrene, α-bromostyrene, β-bromostyrene, 2-hydroxystyrene, and 4-hydroxystyrene, and among these, be most preferably styrene or α-methylstyrene.

The tert-butyl (meth)acrylate-based monomer may be tert-butyl methacrylate.

The (meth)acrylamide-based monomer may be, but is not limited to, for example, methacrylamide, N-substituted methacrylamide, and methacrylamide comprising an aliphatic ring and/or an aromatic ring. A substituent group of the N-substituted methacrylamide may be, but is not limited to, an ethyl group, an isopropyl group, a tert-butyl group, a cyclohexyl group, a benzyl group, a phenyl group, and the like. Among the above-mentioned (meth)acrylamide-based monomers, methacrylamide is most preferable.

In the acryl-based copolymer, amounts of the alkyl (meth) acrylate-based monomer, the monomer comprising the cyclic pendant structure, the (meth)acrylamide-based monomer, and the tert-butyl (meth)acrylate-based monomer may be, but is not limited to, 50 parts by weight to 89 parts by weight, 10 parts by weight to 40 parts by weight, 0 to 10 parts by weight, 1 part by weight to 30 parts by weight, respectively.

The acryl-based copolymer may preferably have a glass transition temperature of more than 120° C., and more preferably may have a glass transition temperature ranging from 120° C. to 200° C.

According to another aspect of the present invention, there is provided a resin composition comprising the above-mentioned acryl-based copolymer.

According to another aspect of the present invention, there is provided an optical film comprising an acryl-based copolymer comprising one or more selected from the group consisting of an alkyl (meth)acrylate-based monomer, a monomer comprising a cyclic pendant structure, a tert-butyl (meth)acrylate-based monomer, and a (meth)acrylamide-based monomer.

The optical film may have in-plane retardation value ranging from 80 to 150 nm, thickness retardation value ranging from 100 to 200 nm, and thickness retardation value/in-plane retardation value ratio ranging from 1.3 to 1.6.

According to another aspect of the present invention, there is provided a compensation film comprising the above-mentioned optical film for an IPS mode.

Advantageous Effects

Since an optical film manufactured using an acryl-based copolymer of the present invention has a high glass transition temperature of more than 120° C., it has excellent heat resistance and optical properties suitable for the manufacturing of an IPS mode compensation film.

BEST MODE

Hereinafter, the present invention will be described in more detail.

First, terms will be described.

The term "copolymer" as used herein means a polymer of two or more monomers comprised in a repeating unit, is not particularly limited in terms of shape, and should be understood to be a concept comprising all of an alternating copolymer, a block copolymer, a random (statistical) copolymer, and a graft copolymer. In a case in which a copolymer of the present invention is used for manufacturing an optical film, it is more preferable that the copolymer be a random copolymer so as to secure a sufficient degree of transparency.

Also, the term "(meth)acrylate-based monomer" as used herein should be understood as referring to an acrylate-based monomer or a methacrylate-based monomer.

Also, the term "(meth)acryamide-based monomer" as used herein should be understood as being an acryamide-based monomer or a methacrylamide-based monomer.

Also, the term "tert-butyl (meth)acrylate-based monomer" as used herein should be understood as referring to a tert-butyl acrylate-based monomer or a tert-butyl methacrylate-based monomer.

The acryl-based copolymer of the present invention may comprise (1), an alkyl (meth)acrylate-based monomer, (2), a monomer comprising a cyclic pendant structure, and (3), a tert-butyl (meth)acrylate-based monomer and/or (meth)acrylamide-based monomer. At this time, the tert-butyl (meth)acrylate-based monomer and the (meth)acrylamide-based monomer may be used alone or in combination. That is, the acryl-based copolymer of the present invention may be a three-membered copolymer of an alkyl (meth)acrylate-based monomer/monomer comprising a cyclic pendant structure/tert-butyl (meth)acrylate-based monomer, or a three-membered copolymer of alkyl (meth)acrylate-based monomer/monomer comprising a cyclic pendant structure/(meth)acrylamide-based monomer, or a four-membered copolymer of an alkyl (meth)acrylate-based monomer/monomer comprising a cyclic pendant structure/tert-butyl (meth)acrylate-based monomer/(meth)acrylamide-based monomer.

The alkyl (meth)acrylate-based monomer function to enhance strength and heat resistance of an optical film. The alkyl group in the alkyl (meth)acrylate-based monomer has preferably a carbon number of 1-10, and more preferably 1-4, and may most preferably be a methyl group or an ethyl group. It is particularly preferable that the alkyl (meth)acrylate-based monomer is methylmethacrylate, but the present invention is not limited thereto.

Meanwhile, in the acryl-based copolymer of the present invention, it is preferable that the alkyl (meth)acrylate-based monomer has an amount of about 50 to 89 parts by weight. When the amount of the alkyl (meth)acrylate-based monomer is within the above-mentioned range, the acryl-based copolymer exhibits excellent transparency, heat resistance and strength.

The monomer comprising a cyclic pendant structure is comprised to provide a positive retardation characteristic, and may preferably be a styrene-based monomer. The styrene-based monomer indicates a compound having a styrene skeleton, such as vinyl aromatic monomer or isopropenyl aromatic monomer.

More specifically, the styrene-based monomer may be one or more selected from the group consisting of styrene, α-methylstyrene, 3-methylstyrene, 4-methylstyrene, 2,4-dimethylstyrene, 2,5-dimethylstyrene, 2-methyl-4-chlorostyrene, 2,4,6-trimethylstyrene, cis-β-methylstyrene, trans-β-methylstyrene, 4-methyl-α-methylstyrene, 4-fluoro-α-methylstyrene, 4-chloro-α-methylstyrene, 4-bromo-α-methylstyrene, 4-t-butylstyrene, 2-fluorostyrene, 3-fluorostyrene, 4-fluorostyrene, 2,4-difluorostyrene, 2,3,4,5,6-pentafluorostyrene, 2-chlorostyrene, 3-chlorostyrene, 4-chlorostyrene, 2,4-dichlorostyrene, 2,6-dichlorostyrene, octachlorostyrene, 2-bromostyrene, 3-bromostyrene, 4-bromostyrene, 2,4-dibromostyrene, α-bromostyrene, β-bromostyrene, 2-hydroxystyrene, and 4-hydroxystyrene, and be most preferably styrene or α-methylstyrene.

Meanwhile, in the acryl-based monomer of the present invention, it is preferable that the monomer comprising the cyclic pendant structure have an amount of about 10 to 40 parts by weight. When an optical film is manufactured using the acryl-based copolymer of the present invention, the retardation value may vary, depending on the amount of the monomer comprising the cyclic pendant structure. When the amount of the monomer comprising the cyclic pendant structure is within the above-mentioned range, it is possible to manufacture an optical film having a wanted retardation characteristic, i.e., a retardation characteristic suitable for application thereof to a compensation film. The acryl-based copolymer of the present invention is suitable for manufacturing of an optical film having a positive thickness retardation value, preferably about 100-200 nm, and an in-plane retardation value of about 80-150 nm. Also, in the case of the optical film manufactured using the acryl-based copolymer, the ratio of thickness retardation/in-plane retardation is in a range of about 1.3-1.6, preferably 1.3-1.5. To obtain the above-mentioned ratio, the amount of the monomer comprising the cyclic pendant structure is preferably limited to the above-mentioned range.

Next, the tert-butyl (meth)acrylate-based monomer and the (meth)acrylamide-based monomer are comprised to enhance heat resistance, and may be, for example, tert-butyl methacrylate which may be comprised in an amount of about 1-30 parts by weight. When the amount of the tert-butyl (meth)acrylate-based monomer and the (meth)acrylamide-based monomer is within the above-mentioned range, sufficient heat resistance may be secured.

Meanwhile, the (meth)acrylamide-based monomer is comprised to enhance heat resistance, may comprise, for example, methacrylamide, N-substituted methacrylamide, and methacrylamide comprising an aliphatic ring and/or an aromatic ring. A substituent group of the N-substituted methacrylamide may comprise, but is not limited to, an ethyl group, an isopropyl group, a tert-butyl group, a cyclohexyl group, a benzyl group, a phenyl group, and the like. Among the above-mentioned (meth)acrylamide-based monomers, methacrylamide is most preferable. It is also preferable that the amount of the (meth)acrylamide-based monomer is within a range of about 0-10 parts by weight. When the amount of the (meth)acrylamide-based monomer is within the above-mentioned range, sufficient heat resistance may be secured.

Meanwhile, in the acryl-based copolymer of the present invention, the tert-butyl (meth)acrylate-based monomer and the (meth)acrylamide-based monomer may be used alone or in combination.

The acryl-based copolymer of the present invention comprising the above-mentioned ingredients has a glass transition temperature of more than 120° C., preferably ranging from about 120° C. to about 200° C., more preferably ranging from about 130° C. to about 200° C. Generally, since an optical film used in a display device such as an LCD may be easily damaged due to heat generated from a backlight unit and the like, it is required to have high heat resistance. However, since the acryl-based copolymer of the present invention has a high glass transition temperature of more than 120° C., it may not be easily damaged by heat or the like.

Meanwhile, the acryl-based copolymer of the present invention may be prepared by polymerizing the above-mentioned ingredients using a copolymer preparing method generally used in the art, for example, solution polymerization, bulk polymerization, suspension polymerization, emulsion polymerization, and the like, and among theses, may preferably be prepared using solution polymerization or bulk polymerization.

At this time, it is preferable that the acryl-based copolymer has a weight-average molecular weight ranging from about 50,000 to about 500,000 in order to secure heat resistance and sufficient processability and productivity.

According to yet another aspect of the present invention, there are provided a resin composition comprising the above-mentioned acryl-based copolymer, and an optical film manufactured using the resin composition.

Besides the above-mentioned acryl-based copolymer, the resin composition of the present invention may further comprise additives, such as a coloring agent, a flame retardant, a reinforcing agent, a filler, an antioxidant, a heat stabilizer, and a UV absorbent within a range that does not impair an object of the present invention.

The glass transition temperature of the resin composition may be 120° C. or more, preferably in a range of 120° C. to 200° C., more preferably in a range of 130° C. to 200° C., and the weight-average molecular weight of the resin composition is preferably in a range of 50,000 to 500,000 considering heat resistance, processability and productivity.

The resin composition of the present invention may be formed as an optical film by using a film manufacturing method well known in the art, such as a solution casting process or an extruding process, and the manufactured film is uniaxially or biaxially stretched for retardation expression. At this time, a modifier or the like may be added if necessary.

The stretching may be performed using both machine direction (MD) stretching and transverse direction (TD) stretching. In the case where both of the MD stretching and the TD stretching are undertaken, any one of the MD stretching and the TD stretching is first performed and the other is then undertaken, or the MD stretching and the TD stretching may be simultaneously undertaken. Also, the stretching may be performed as a single step process, or a multi-step process.

Given that the glass transition temperature of the resin composition is Tg, the stretching is preferably performed in a temperature range of (Tg-20)° C. to (T+30)° C., more preferably at Tg. The glass transition temperature refers to a temperature area between a temperature at which the storage modulus of the resin composition starts to be lowered and consequently the loss modulus thereof becomes greater than the storage modulus, and a temperature at which the stretching of a polymer chain may be reduced and lost. The glass transition temperature may be measured by Differential Scanning calorimetry (DSC).

In the case of a small stretching machine (Universal testing machine, Zwick Z010), a stretching operation may be undertaken at a stretching rate in the range of 1 to 100 mm/min. In the case of a pilot stretching equipment, a stretching operation may be undertaken at a stretching rate in the range of 0.1 to 2 m/min. The film may be stretched through the application of an elongation of 5 to 300%.

The optical film manufactured using the resin composition comprising the acryl-based copolymer according to the present invention may have an in-plane retardation value of 80-150 nm, preferably 90-120 nm, more preferably 100-120 nm, and a thickness retardation value of 100-200 nm, preferably 130-170 nm.

The optical film of the present invention may have a ratio of thickness retardation value/in-plane retardation value of 1.3 to 2.0, preferably 1.3 to 1.6.

The in-plane retardation value ($R_{in}$) indicates a value expressed by Equation 1, and the thickness retardation value ($R_{th}$) indicates a value expressed by Equation 2.

$$R_{in}=(n_x-n_y)\times d \qquad \text{[Equation 1]}$$

$$R_{th}=(n_z-n_y)\times d, \qquad \text{[Equation 2]}$$

In Equations 1 and 2, $n_x$ is the maximum refractive index in a plane direction of the optical film, $n_y$ is a refractive index in a direction of the optical film perpendicular to the direction of $n_x$, $n_z$ is a refractive index in a thickness direction, and d is the thickness of the film.

The optical film having the above-mentioned characteristics according to the present invention may be properly used as a retardation compensation film. At this time, the optical film may be used alone, or may be used after having undergone a predetermined post-process for control of the refractive index, such as a coating. In particular, the optical film of the present invention may be usefully used as an IPS mode compensation film after having undergone a post-process for controlling a thickness direction refractive index.

MODE FOR INVENTION

The present invention will be explained in more detail through concrete Examples.

EXAMPLE

In the Examples of the present invention, a method of evaluating a physical property will be described below.

1. Weight-average molecular weight (Mw): measured through gel permeation chromatography (GPC) by melting manufactured resin into tetrahydrofuran.

2. Glass transition temperature (Tg): measured by using differential scanning calorimeter (DSC) by TA Instruments.

3. Retardation value ($R_{in}/R_{th}$): measured by using an AxoScan by Axometrics, after stretching the film at the glass transition temperature, and the measured values were converted to retardation values for a film having a thickness of 60 μm.

Example 1

An acryl-based copolymer resin comprising 60 parts by weight of methyl methacrylate, 20 parts by weight of styrene, and 20 parts by weight of tert-butyl methacrylate was prepared. The prepared resin had a glass transition temperature of 130° C. and a weight-average molecular weight of 145,000. This resin was manufactured in a film phase by using a solution casting process, and stretched at the glass transition temperature to manufacture a film. Retardation values of the manufactured film were measured. As a result, thickness retardation value/in-plane retardation value was 175/119.

Example 2

An acryl-based copolymer resin comprising 50 parts by weight of methyl methacrylate, 25 parts by weight of styrene, and 25 parts by weight of tert-butyl methacrylate was prepared. The prepared resin had a glass transition temperature of 133° C. and a weight-average molecular weight of 150,000. This resin was manufactured in a film phase by using a solution casting process, and stretched at the glass transition temperature to manufacture a film. Retardation values of the manufactured film were measured. As a result, thickness retardation value/in-plane retardation value was 196/144.

Example 3

An acryl-based copolymer resin comprising 70 parts by weight of methyl methacrylate, 20 parts by weight of styrene, and 10 parts by weight of methacrylamide was prepared. The prepared resin had a glass transition temperature of 130° C. and a weight-average molecular weight of 104,000. This resin was manufactured in a film phase by using a solution casting process, and stretched at the glass transition temperature to manufacture a film. Retardation values of the manufactured film were measured. As a result, thickness retardation value/in-plane retardation value was 168/115.

Example 4

An acryl-based copolymer resin comprising 60 parts by weight of methyl methacrylate, 25 parts by weight of styrene, and 15 parts by weight of methacrylamide was prepared. The prepared resin had a glass transition temperature of 131° C. and a weight-average molecular weight of 103,000. This resin was manufactured in a film phase by using a solution casting process, and stretched at the glass transition temperature to manufacture a film. Retardation values of the manufactured film were measured. As a result, thickness retardation value/in-plane retardation value was 185/135.

Example 5

An acryl-based copolymer resin comprising 60 parts by weight of methyl methacrylate, 20 parts by weight of styrene, 10 parts by weight of tert-butyl methacrylate, and 10 parts by weight of methacrylamide was prepared. The prepared resin had a glass transition temperature of 134° C. and a weight-average molecular weight of 155,000. This resin was manufactured to have a film phase by using a solution casting process, and stretched at the glass transition temperature to manufacture a film. Retardation values of the manufactured film were measured. As a result, thickness retardation value/in-plane retardation value was 167/121.

Example 6

An acryl-based copolymer resin comprising 50 parts by weight of methyl methacrylate, 25 parts by weight of styrene, 20 parts by weight of tert-butyl methacrylate, and 5 parts by weight of methacrylamide was prepared. The prepared resin had a glass transition temperature of 135° C. and a weight-average molecular weight of 175,000. This resin was manufactured in a film phase by using a solution casting process, and stretched at the glass transition temperature to manufacture a film. Retardation values of the manufactured film were measured. As a result, thickness retardation value/in-plane retardation value was 175/131.

Comparative Example 1

An acryl-based copolymer resin comprising 80 parts by weight of methyl methacrylate, and 20 parts by weight of styrene was prepared. The prepared resin had a glass transition temperature of 115° C. and a weight-average molecular weight of 108,000. This resin was manufactured in a film phase by using a solution casting process, and stretched at the glass transition temperature to manufacture a film. Retardation values of the manufactured film were measured. As a result, thickness retardation value/in-plane retardation value was 169/120.

As a result of the experiments, the acryl-based copolymer resin of Comparative Example 1 which did not comprise tert-butyl (meth)acrylate- or (meth)acrylamide-based monomer exhibited a similar retardation value range to those in Examples, but it could be seen that a low glass transition temperature reduced heat resistance.

The invention claimed is:
1. An optical film formed of a resin composition comprising an acryl-based copolymer, the copolymer comprising:
an alkyl (meth)acrylate-based monomer;
a monomer comprising a cyclic pendant structure;
a tert-butyl (meth)acrylate-based monomer; and
a (meth)acrylamide-based monomer.
2. The optical film of claim 1, wherein the alkyl (meth)acrylate-based monomer has an alkyl group having a carbon number of 1-10.
3. The optical film of claim 1, wherein the alkyl (meth)acrylate-based monomer is methyl (meth)acrylate.
4. The optical film of claim 1, wherein the monomer comprising the cyclic pendant structure is styrene-based monomer.
5. The optical film of claim 4, wherein the styrene-based monomer is one or more selected from the group consisting of styrene, α-methylstyrene, 3-methylstyrene, 4-methylstyrene, 2,4-dimethylstyrene, 2,5-dimethylstyrene, 2-methyl-4-chlorostyrene, 2,4,6-trimethylstyrene, cis-β-methylstyrene, trans-β-methylstyrene, 4-methyl-α-methylstyrene, 4-fluoro-α-methylstyrene, 4-chloro-α-methylstyrene, 4-bromo-α-methylstyrene, 4-t-butylstyrene, 2-fluorostyrene, 3-fluorostyrene, 4-fluorostyrene, 2,4-difluoro styrene, 2,3,4,5,6-pentafluorostyrene, 2-chlorostyrene, 3-chlorostyrene, 4-chlorostyrene, 2,4-dichlorostyrene, 2,6-dichlorostyrene, octachlorostyrene, 2-bromostyrene, 3-bromostyrene, 4-bromostyrene, 2,4-dibromostyrene, α-bromostyrene, β-bromostyrene, 2-hydroxystyrene, and 4-hydroxystyrene.
6. The optical film of claim 1, wherein the tert-butyl (meth)acrylate-based monomer is tert-butyl methacrylate.

7. The optical film of claim 1, wherein the (meth)acrylamide-based monomer is one or more selected from the group consisting of methacrylamide, N-substituted methacrylamide, and methacrylamide comprising an aliphatic ring and/or an aromatic ring.

8. The optical film of claim 1, wherein the acryl-based copolymer comprises:
   50-89 parts by weight of the alkyl (meth)acrylate-based monomer;
   10-40 parts by weight of the monomer comprising the cyclic pendant structure;
   1-30 parts by weight of the tert-butyl (meth)acrylate-based monomer; and
   5-10 parts by weight of the (meth)acrylamide-based monomer.

9. The optical film of claim 8, wherein the acryl-based copolymer comprising:
   50-89 parts by weight of a methyl methacrylate monomer;
   10-40 parts by weight of a styrene monomer;
   1-30 parts by weight of a tert-butyl methacrylate monomer; and
   5-10 parts by weight of a methacrylamide monomer.

10. The optical film of claim 1, wherein the acryl-based copolymer has a glass transition temperature ranging from 120° C. to 200° C.

11. An IPS mode liquid crystal display comprising the optical film of claim 1 as a compensation film.

* * * * *